(12) United States Patent
Yaffe

(10) Patent No.: US 9,058,213 B2
(45) Date of Patent: Jun. 16, 2015

(54) CLOUD-BASED MAINFRAME INTEGRATION SYSTEM AND METHOD

(75) Inventor: Lior Yaffe, Hadera (IL)

(73) Assignee: SOFTWARE AG, Darmstadt (DE)

(*) Notice: Subject to any disclaimer, the term of this patent is extended or adjusted under 35 U.S.C. 154(b) by 0 days.

(21) Appl. No.: 13/247,179

(22) Filed: Sep. 28, 2011

(65) Prior Publication Data

US 2013/0060838 A1 Mar. 7, 2013

(30) Foreign Application Priority Data

Sep. 1, 2011 (EP) .................................... 11179706

(51) Int. Cl.
G06F 15/16 (2006.01)
G06F 9/50 (2006.01)
H04L 29/08 (2006.01)

(52) U.S. Cl.
CPC ............... G06F 9/5027 (2013.01); H04L 67/20 (2013.01); H04L 67/025 (2013.01); H04L 67/10 (2013.01)

(58) Field of Classification Search
USPC ........... 709/203; 380/255, 264, 276; 713/150, 713/163, 181; 726/2, 21, 36
See application file for complete search history.

(56) References Cited

U.S. PATENT DOCUMENTS

| | | | |
|---|---|---|---|
| 7,562,146 B2 | 7/2009 | Panasyuk et al. | |
| 7,877,783 B1 | 1/2011 | Cline et al. | |
| 7,877,794 B2 | 1/2011 | Fujiwara et al. | |
| 8,364,638 B2 * | 1/2013 | Nickolov et al. | 707/636 |
| 2005/0114712 A1 * | 5/2005 | Devine et al. | 713/201 |
| 2011/0022812 A1 * | 1/2011 | Van Der Linden et al. | 711/163 |

OTHER PUBLICATIONS

Mariana Carroll, Paula Kotzé, Alta van der Merwe (2012). "Securing Virtual and Cloud Environments". In I. Ivanov et al. Cloud Computing and Services Science, Service Science: Research and Innovations in the Service Economy. Springer Science+Business Media.*
Mosha, http://www.mosha.net/01-telnet-gateway/telnet.shtml, downloaded Sep. 28, 2011.
"Support Through HTTP", http://www.webnms.com/snmp/help/snmpapi/snmpv1/applet_development/http_support.html, downloaded Sep. 28, 2011.
"HTTP tunnel", http://en.wikipedia.org/wiki/HTTP_tunnel, downloaded Sep. 28, 2011.
Search Report issued in corresponding European Application No. 11179706.4 on Feb. 7, 2012.
"WebSphere Application Server V6 Scalability and Performance Handbook," IBM/Redbooks, May 1, 2005, pp. 1-370.
Wakelin et al., "Integrating WebSphere Application Server and CICS using the J2EE Connector Architecture," IBM, Jan. 31, 2006, pp. 1-24.
DMZ (computing) Wikipedia article, May 7, 2013, pp. 1-4.

* cited by examiner

Primary Examiner — Jason K. Gee
Assistant Examiner — Sharif E Ullah
(74) Attorney, Agent, or Firm — Nixon & Vanderhye, PC

(57) ABSTRACT

The present technology concerns a cloud-based mainframe integration system for providing at least one client access to at least one mainframe, the at least one mainframe being accessible over a persistent communication connection. The cloud-based mainframe integration system comprises, at least one mainframe integration server, adapted for routing communications between the at least one client and the at least one mainframe. The at least one MIS is located within a cloud computing environment separate from a computer network in which the at least one mainframe is located. The at least one MIS also is adapted for communicating with the separate network over a non-persistent communication connection.

20 Claims, 3 Drawing Sheets

CLOUD-BASED MAINFRAME INTEGRATION SYSTEM AND METHOD

Figure 1:
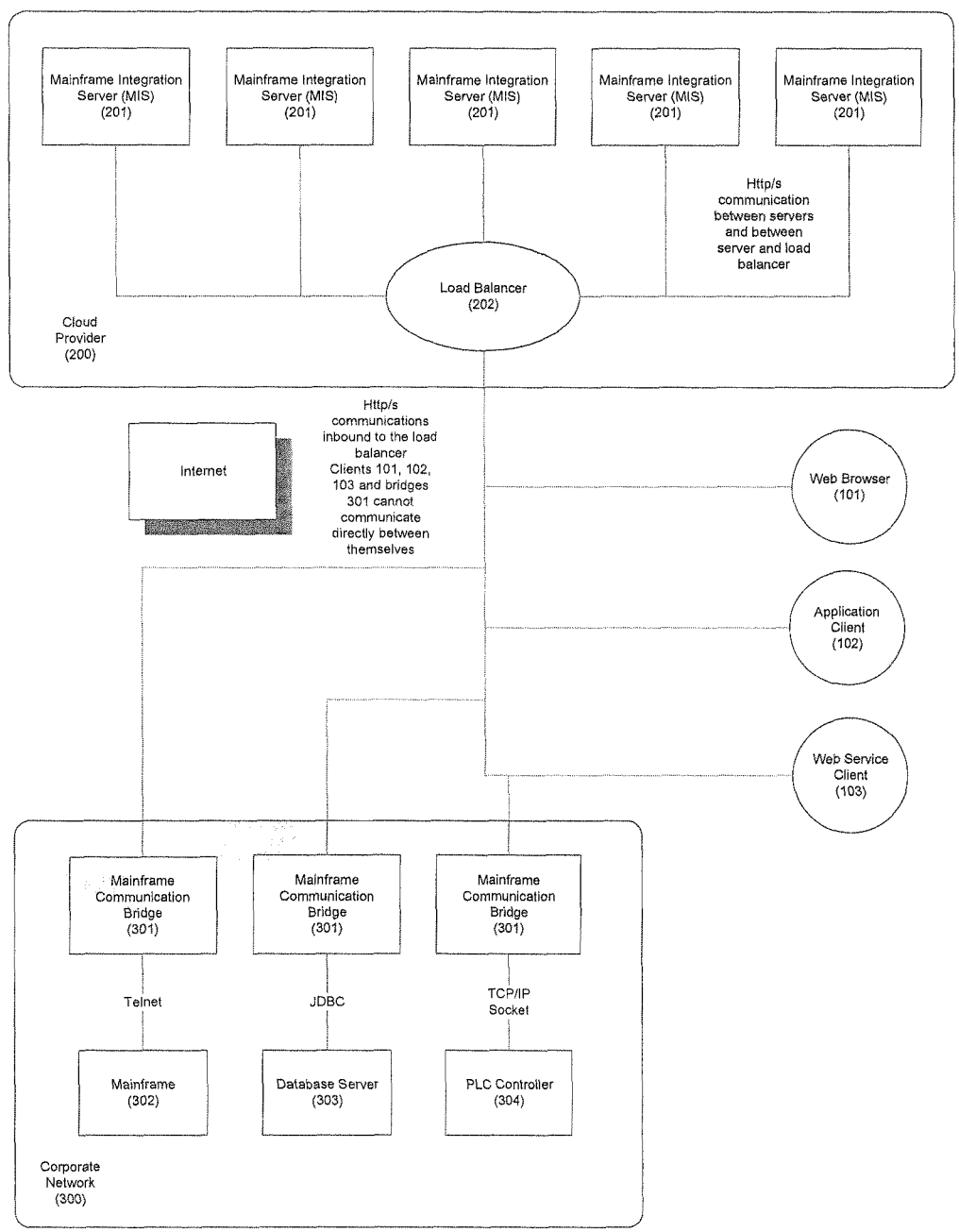

This application claims priority to EP Application No. 11 179 706.4, filed 1 Sep. 2011, the entire contents of which is hereby incorporated by reference.

1. TECHNICAL FIELD

The present concerns a cloud-based mainframe integration system for providing clients access to mainframes and a corresponding method.

2. BACKGROUND AND SUMMARY

Organizations oftentimes use applications running on legacy systems, such as mainframes that have been in place for a long time and serve for driving mission-critical computations. In order to integrate such legacy mainframes into modern computing environments, it is known to employ so-called mainframe integration products. The task of mainframe integration, however, is very complex, resource-intensive and time-consuming due to the fundamental technical differences between the legacy mainframe world and modern computing environments, as e.g. outlined in "*A Better Path Toward Legacy Integration with the Cloud*" (cf. http://cloud-computing.sys-con.com/node/1880221).

Generally, mainframe integration products are designed to route communications between clients and the mainframe. To this end, they typically communicate with client web browsers and/or web service consumers using modern protocols (e.g. HTTP/S and/or SOAP) on the one hand and communicate on the other hand with the legacy mainframe using mainframe protocols, such as telnet connections over a TCP/IP socket or even SNA connections in very old systems. In this context, mainframe integration products have to establish a persistent TCP/IP connection with the mainframe. Examples of known mainframe integration products are e.g. disclosed in U.S. Pat. No. 7,877,783 B1, U.S. Pat. No. 7,877,794 B2 and U.S. Pat. No. 7,562,146 B2.

Moreover, the communication between a client and a mainframe is generally screen-based, in that the requesting entity (the client) is served with display screens of the legacy mainframe one after another and may navigate between these screens. Therefore, a given communication typically comprises a plurality of request/response cycles between the client and the mainframe, i.e. each cycle is always part of a larger "session", in that the current request/response cycle depends upon the preceding screens through which the user has navigated beforehand.

Examples of mainframe hardware and their corresponding operating systems are IBM AS/400, z/OS, VSE, MVS, BS2000, Tandem, which typically communicate with mainframe integration products over Telnet-based protocols, such as TN3270, TN5250, BS2000 and Tandem protocols.

Furthermore, in a different area of computing apart from mainframe integration, "cloud computing" becomes more and more popular. "Cloud computing" refers to the concept of moving certain parts of an application's processing tasks to a third-party environment located outside of the application's network, in particular on the Internet. The third-party cloud computing environment hosts the deployed application on one or multiple servers, which makes it possible to benefit from the vastly increased processing capabilities offered thereby, as compared to traditional "local processing". Various commercial cloud-computing environments are already in place, e.g. Amazon EC2 or Google Apps, which allow deploying web services to the Internet, which are then executed on the cloud computing provider's servers. As the skilled person will readily observe, Internet communications and web services generally rely on the concept of "loosely coupled" entities, in which a given request/response cycle is independent of any preceding communication cycles.

In view of the above, deploying a mainframe integration product "to the cloud" is very difficult. Firstly, organizations will hardly agree to expose their mainframe telnet access to a third-party cloud computing environment located on the Internet due to security concerns. Secondly, having to adhere to the above-described stateless request/response scheme employed in Internet communications makes it very difficult to deploy a mainframe integration product to a cloud computing environment due to the stateful screen-based nature of mainframe applications.

It is therefore the technical problem underlying the present technology to provide an approach for cloud-based mainframe integration that at least partly overcomes the above explained disadvantages of the prior art.

This problem is according to one aspect of the technology solved by a cloud-based mainframe integration system for providing at least one client access to at least one mainframe, the at least one mainframe being accessible over a persistent communication connection. In the embodiment of claim 1, the cloud-based mainframe integration system comprises:

a. at least one mainframe integration server (MIS), adapted for routing communications between the at least one client and the at least one mainframe;

b. wherein the at least one MIS is located within a cloud computing environment separate from a computer network in which the at least one mainframe is located; and c. wherein the at least one MIS is adapted for communicating with the separate network over a non-persistent communication connection.

Accordingly, the embodiment defines a mainframe integration system, whose mainframe integration server (MIS) executes inside a cloud computing environment (preferably operated by a third-party) and thus outside of the (corporate) computer network in which the mainframe resides. Advantageously, the MIS communicates with the separate network over a non-persistent communication connection (typically the Internet) and preferably uses standard Internet protocols such as HTTP/S. As a result, the persistent communication connection required by the mainframe can be safely kept inside the mainframe's network, thereby avoiding the mainframe's security-critical telnet access to be revealed on the insecure Internet. This approach hence differs from traditional mainframe integration products, which are always located within the same network as the mainframe itself (due to the required persistent connection and/or security requirements).

In a preferred implementation of the above-described system, the non-persistent communication connection between the cloud computing environment and the mainframe's network is used for tunneling the mainframe protocol communication (e.g. telnet) over standard Internet protocols such as HTTP/S. In this context, the person skilled in the art will appreciate that HTTP gateways for telnet connections are already known (cf. e.g. http://www.mosha.net/01-telnet-gateway/telnet.shtml). However, such known HTTP-telnet-gateways still require revealing the telnet access credentials over the internet and thus cannot be employed in the present context due to security reasons. In addition, they do not support maintaining and/or replicating the session state between multiple MIS nodes, they do not allow for increasing and decreasing the number of MIS instances elastically based on the application load and they do not support encapsulating multiple MIS instances behind a single load balancer entry point.

In summary, the above-described system allows the security-relevant telnet access to be safely kept inside the corporate network containing the mainframe, while the "intelligent part" of the mainframe integration product (the MIS) can be deployed "to the cloud" (i.e. to the cloud computing environment), thereby being able to benefit from the advantages of a cloud computing environment, such as increased processing power, scalability and fail-safety.

In another aspect of the present technology, the cloud-based mainframe integration system further comprises at least one mainframe communication bridge (MCB) located within the network of the at least one mainframe, the at least one MCB being adapted for maintaining a persistent communication connection with the at least one mainframe and further adapted for communicating with the cloud computing environment over the non-persistent communication connection. Accordingly, the mainframe integration application is actually divided into two separate components, namely at least one mainframe integration server (MIS) and at least one mainframe communication bridge (MCB). The MIS is located within a cloud computing environment preferably provided by a third-party, whereas the MCB resides within a separate computer network, more precisely that local network in which also the mainframe is located. The MCB maintains a required persistent connection with the mainframe (e.g. over a persistent TCP/IP socket). The communication between the MCB and the MIS is, on the contrary, performed over a non-persistent connection, preferably using internet protocols such as HTTP, HTTPS and/or SOAP.

In yet another aspect, the at least one MIS may be adapted for storing a session state relating to a request/response cycle of the communication between the at least one client and the at least one mainframe, the session state being usable for subsequent request/response cycles between the at least one client and the at least one mainframe. As explained above, mainframe communications are generally session-based, in that a given communication normally comprises a sequence of multiple request/response cycles between the client and the mainframe. Accordingly, the MIS stores a session state, which may be used in a current request/response cycle to correlate this cycle with a preceding cycle.

Preferably, the at least one MIS is adapted for sending the session state to the at least one MCB for being stored at the at least one MCB. Accordingly, the current session state is advantageously replicated to the MCB, which therefore serves as a backup. This aspect allows a given MIS to stop executing at any arbitrary point in time without interrupting a given client/mainframe communication, since the current session state may be easily restored from the MCB. This aspect is particularly advantageous in the context of cloud computing, since new server instances are frequently started (spawned) and old server instances are frequently "killed" in cloud computing environments.

Additionally or alternatively, the cloud-based mainframe integration system further comprises a load balancer, wherein the load balancer is adapted for dispatching a communication coming from the network of the at least one mainframe to one of a plurality of MIS inside the cloud computing environment. Accordingly, each request entering the cloud computing environment is dispatched to any of a plurality of given MIS instances (in accordance with the load balancer's scheduling policy). This aspect has the advantageous effect that the processing load of multiple client/mainframe communications can be optimally balanced between all available MIS instances, thereby allowing an optimal resource usage.

In this context, the MIS selected by the load balancer is preferably adapted for obtaining a current session state relating to the communication from another MIS, if the selected MIS does not possess the current session state. Accordingly, any newly started (spawned) MIS instance—which does not possess the session state required to handle a given client/mainframe communication—can still handle this communication by obtaining the session state from another MIS instance. As a result, the flexibility of the present system is improved to a great extent, since new MIS instances can be dynamically added to the cloud computing environment and take over the processing of already existing client/mainframe communications.

In yet another aspect, the MIS selected by the load balancer is adapted for obtaining a current session state relating to the communication from the at least one MCB, if none of the other MIS possesses the current session state. Accordingly, even if all MIS instances possessing the current session information are no longer available, the communication can still be handled based on the session state backup stored at the MCB. This aspect allows the cloud provider for removing any given MIS instance without the need to check whether it is the last instance to hold a given session state.

Furthermore, the at least one MIS may be adapted for sending a connection identifier to the at least one client, the connection identifier identifying the MCB which handled the communication between the at least one client and the at least one mainframe. Accordingly, after having handled a given request/response cycle, the MIS may provide the client with a "cookie" storing the ID of the MCB that was involved in the cycle. As a result, the at least one MIS may be adapted for receiving a client request comprising the connection identifier and further adapted for determining whether it already established a connection to the at least one MCB identified by the connection identifier, and if not, redirecting the client request back to the load balancer. Accordingly, if a MIS contacted by a client, through the load balancer, has not yet handled a prior conversation with the desired MCB, the MIS may redirect the client request to the load balancer, so that the load balancer may select another MIS (which hopefully already possesses the connection to the desired MCB). To this end, the at least one MIS may add its own identifier to the client request when redirecting the client request to the load balancer, so that the load balancer does not dispatch the request again to the MIS from which the request was redirected.

Preferably, the at least one MCB can communicate with the at least one MIS only via the load balancer, and wherein the at least one MCB is adapted for sending a plurality of registration requests to the load balancer in order to register with substantially all MIS instances. Accordingly, since a given MCB cannot tell for sure how many MIS are currently running inside the cloud computing environment (behind the load balancer), the MCB preferably executes a registration loop in which it intends to register with most of the MIS, as will be further explained in the detailed description below.

The present technology further concerns a method for providing at least one client access to at least one mainframe, the at least one mainframe being accessible over a persistent communication connection, the method comprising the steps of routing, by at least one mainframe integration server (MIS), communications between the at least one client and the at least one mainframe, wherein the at least one MIS is located within a cloud computing environment separate from a computer network in which the at least one mainframe is located, and wherein the at least one MIS is adapted for communicating with the separate network over a non-persistent communication connection. Further advantageous modifications of embodiments of the method of the technology are defined in further dependent claims, wherein the present method may generally perform any of the functionalities described above in connection with the cloud-based mainframe integration system. Moreover, a computer program is provided comprising instructions for implementing any of the above methods.

3. SHORT DESCRIPTION OF THE DRAWINGS

Figure 2:
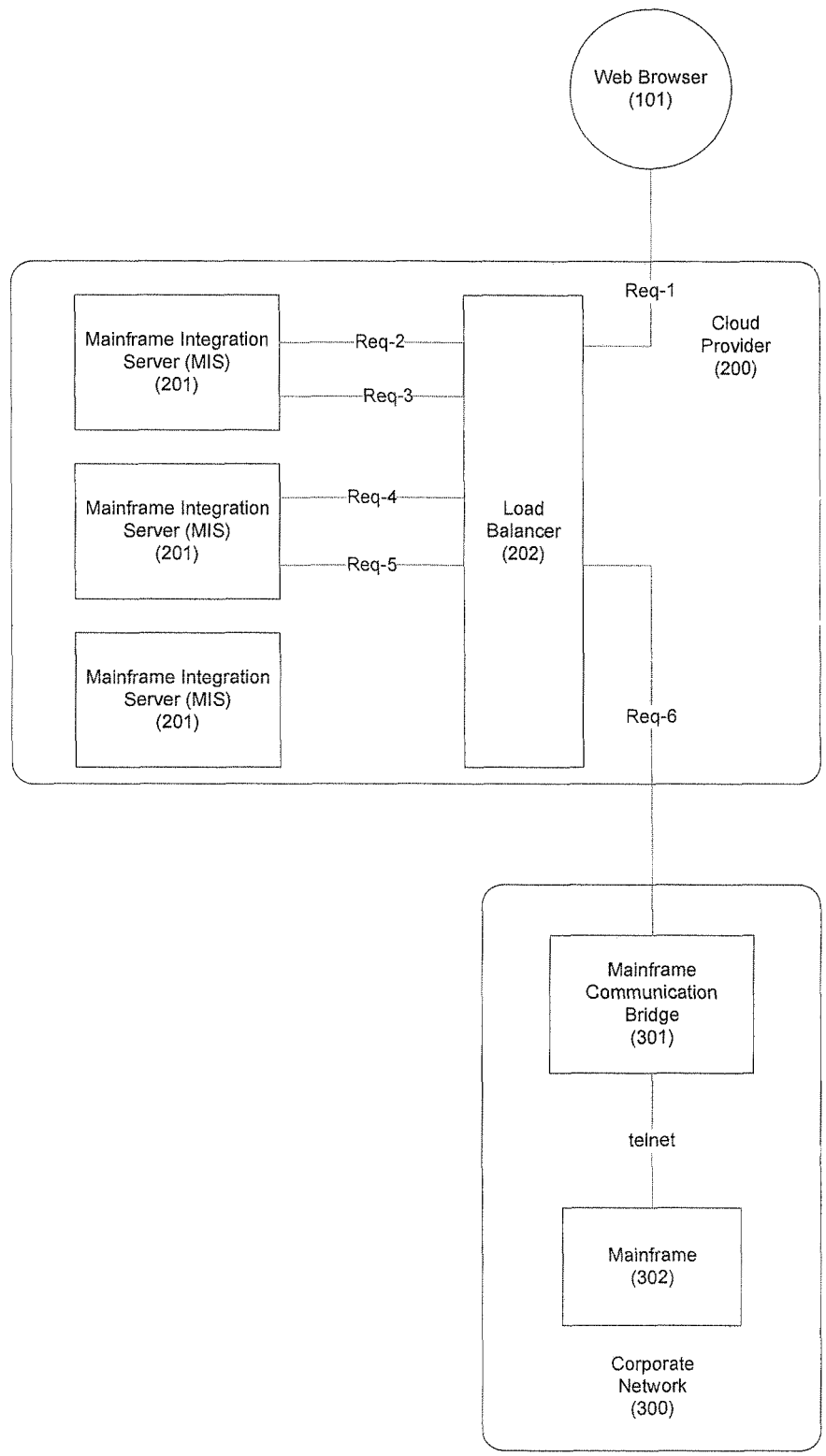
Figure 3:
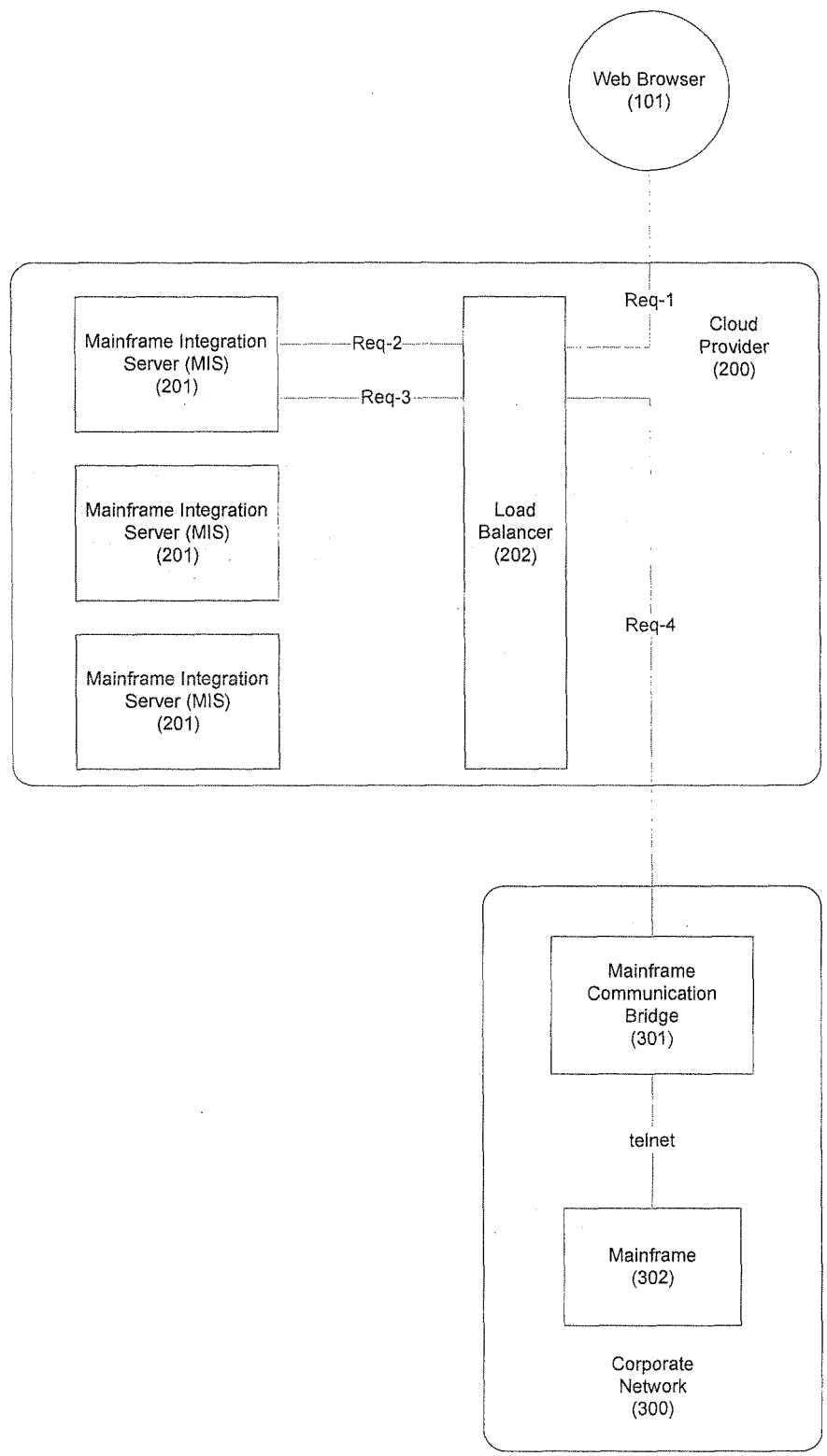

In the following detailed description, presently preferred embodiments are further described with reference to the following figures:

FIG. 1: A block diagram of a mainframe integration system in accordance with an embodiment; and FIGS. 2-3: Schematic overviews of a client/mainframe communication routed through a mainframe integration system in accordance with an embodiment.

4. DETAILED DESCRIPTION

In the following, a presently preferred embodiment of the technology is described with respect to a mainframe integration system as schematically shown in FIG. 1. As can be seen the system comprises at least one mainframe integration server (MIS) 201 which is preferably responsible for the business logic of the mainframe integration and which may thus perform processes such as terminal emulation, screen identification, representing screen information as objects and j or rendering web interfaces from mainframe screens. The MIS 201 preferably hosts most of the functionality included in products such as the ApplinX server of applicant. Furthermore, the system comprises at least one mainframe communication bridge (MC13) 301 acting as a bridge between the MIS 201 and the mainframe 302. The MCB 301 is preferably responsible for communicating with the mainframe 302 using a mainframe protocol, such as telnet over a TCP/IP socket, as well as communicating with the MIS 201 using a standard internet protocol, such as Http/s. In other words, one aspect of the present technology is to replace the telnet TCP/IP connection between the MIS 201 and mainframe 302 with a request/response mode Http/s communication.

Again with reference to FIG. 1, the at least one MIS 201 is located within a cloud computing environment 200, e.g. provided by a third-party cloud solution such as Amazon EC2 or Google Apps, which typically provides a dynamically allocated pool of virtual machines and a single domain URI entry point (preferably for Http/s communication). The MIS 201 shown in FIG. 1 preferably comprise a web application such as webMethods ApplinX of applicant, designed for integrating a mainframe backend with web application clients 101, 102, 103. Exemplary types of clients are web browsers 101 adapted for rendering Html pages, web application clients 102 based on Java Applets, Microsoft Silver Light and/or Adobe Flex (preferably communicating using Http/s) and/or web service clients 103 (preferably communicating using Soap/Rest).

As can be seen in FIG. 1, multiple instances of the MIS 201 may be deployed inside the cloud computing environment 200, preferably on a single or multiple virtual machines.

The cloud computing environment 200 may further comprise an optional load balancer 202. The load balancer 202 preferably represents a single entry point into the cloud computing environment 200 and is adapted to distribute the processing load between MIS instances 201.

Separate from the cloud computing environment 200 shown in FIG. 1 is the computer network 300, which is preferably a corporate network representing the internal intranet of the organization using the mainframe integration system of the present invention technology. Importantly, the network does not have to trust the cloud provider 200 and preferably does not allow inbound connections from the cloud into the corporate network.

Inside the computer network 300, one or more MCBs 301 are provided. An MCB 301 provides a bridge between the mainframe 302 and the cloud computing environment 200, by communicating with the mainframe 302 over standard mainframe protocols and by communicating with the cloud computing environment 200 preferably using Http packets that encapsulate the mainframe protocol packets. A single MCB 301 communicating with the cloud provider 200 may multiplex multiple mainframe connections over a single Http/s request. Multiple MCB instances 301 may be provided inside the corporate network 300, possibly communicating with the same mainframe 302. The mainframe 302 in turn communicates with the MCB 301 preferably using mainframe protocols such as 3270 and/or 5250. Additionally or alternatively, instead of mainframes 302, the present technology may also support database server(s) 303, PLC controller(s) 304, or any other backend host requiring a persistent TCP/IP socket communication.

Preferably, the at least one MIS 201 is stateless, in the sense that it does not rely on an existing session state. Instead, all MIS instances 201 are preferably configured identically and/or session state(s) created by the MIS 201 is/are serialized into the MCB 301. Furthermore, the MIS 201 is preferably web friendly, in that it communicates only using web friendly protocols such as Http/s and Soap. The MIS 201 will preferably never issue an outbound connection to the client KA, 102, 103 or to the MCB 301, but will only accept Http/s requests originating from the cloud endpoint or another MIS 201. Moreover, in case an MIS 201 fails (e.g. due to a hardware failure, scheduled maintenance or other interruption of its normal processing), the overall system stability should not be impacted, thus allowing for elastic scaling.

The above-described properties allow the MIS 201 to be massively scaled to multiple nodes in the cloud computing environment 200, without requiring clients such as web browsers 101 or web service consumers 102 and 103 to maintain session affinity and using only standard web compatible communication. The ability to elastically increase and decrease the number of MIS instances 201 allows for a very efficient resource usage of the mainframe integration deployment. In contrast, known mainframe integration products of the prior art are always tied to a constant number of server machines, even when they are only lightly used, which waists computing power, or which may cause service disruption in times of heavy use.

The at least one MCB 301, on the other hand, is preferably stateful, in the sense that each instance of the MCB 301 maintains one or more, preferably a plurality of, persistent connections to the mainframe 302 and maintains for each connection a (serializable) data structure representing the mainframe's session state. In addition, the MCB 301 is preferably lightweight, in that it implements only minimal functionality (since the major part of the mainframe integration logic is implemented in the MIS 201). Also the MCB 301 is preferably scalable, in that it may be scaled to multiple instances to allow for support of a massive number of mainframe connections. Generally, the MCB 301 is typically deployed inside the corporate network 300, preferably behind a firewall, so that it may communicate with the mainframe 302 reliably, whereas it communicates with the MIS 201 only using Http/s.

The cloud computing environment 200 preferably exposes to the clients (e.g. web browsers 101, web service clients 103 and/or MCB instances 301) a single domain entry point URI (such as www.mycloud.com), which is used by all clients 101, 102, 103 and MCB instances 301 to communicate with the MIS instances 201 running inside the cloud 200. In turn, the MIS instances 201 running inside the cloud 200 are preferably able to connect to each other using a unique URI published by each MIS instance 201 and able to connect to the same cloud entry point seen by the clients. Preferably, the MIS instances 201 cannot send outbound requests to the client(s) 101, 102, 103 or MCB instances 301. Further, the communication between MCB instances 301 and between MIS instances 201 and the cloud entry point are using Http REST style URI syntax.

Mainframe Integration Server Lifecycle

Initialization: Upon startup, the MIS instance initializes its application logic (e.g. the ApplinX application) and obtains the mainframe definitions, including the address and port of the mainframe(s) 302 to be serviced, e.g. from a configuration file. When a MIS instance is initialized by the cloud computing environment, it preferably registers itself (preferably its IP address) with a routing table of the load balancer 202 and waits for the load balancer 202 to start forwarding requests from MCB instances 301 and/or clients 101, 102, 103. Note that initially the MIS instance 201 is preferably unaware of other MIS instances 201 running in the cloud 200 and/or MCB instances 301 running inside the corporate network 200. Thus, the present technology does not rely on a central node registry or shared database. On the contrary, a MIS instance 201 waits for MCB instances 301 to register with it before it becomes fully operational.

Termination: When a MIS instance 201 is terminated, its IP address is preferably removed from the routing table of the load balancer 202, either proactively by notifying the load balancer 202, and/or by the load balancer 202 itself, when failing to communicate with the particular MIS 201.

Keep Alive: The load balancer 202, may send keep alive requests to all MIS instances 201 registered in its routing table, depending on the load balancer implementation.

Mainframe Communication Bridge registration

Upon start-up, periodically and/or upon request, the MCB 301 may read the address (e.g. the URI) of the cloud entry point from a configuration file of the MCB 301 (i.e. the address to be used to access the cloud computing environment 200, more precisely its load balancer 202). The MCB 301 will attempt to register itself with most of the running MIS instances 201, preferably using the handshake algorithm described in the following. However, the MCB 301 preferably never communicates directly with a MIS instance 201, but only communicates with the cloud entry point/load balancer 202. Therefore, since the MCB 301 cannot tell for sure how many MIS instances 201 are running behind the cloud load balancer 202, an MCB 301 preferably always attempts a pre-configured number of connection requests, e.g. configured by the MCB startup parameters, which should be larger than the number of running MIS instances 201:

```
Let maxRetires be the number of MCB registration requests.
count = 0
While (count < maxRetires) {
    count ++
    GET /register?id=<mcb id> action to the cloud domain URI
    The cloud load balancer will forward the /register action
    to one of the available MIS instances
```

-continued

```
    The receiving MIS instance will query the id field and see
    if an MCB with the same id is already registered and then
    send the following response:
        If id exists return status 200 text "Already
            registered"
        Else return status 200 text "Ok"
    The MCB will parse the response:
    If response status 200 text "Ok" {
        Leave connection open
    Else
        Close connection
    End If
}
```

The cloud load balancer 202 may implement a simple round robin algorithm when distributing requests between the MIS instances 201 with no regard to the identity of the requesting client. As a result, given enough attempts the MCB 301 will eventually be able to register itself with every available MIS instance 201. Since this cannot be guaranteed, the above registration loop preferably terminates after a pre-defined number of connection attempts, taking into account that the MCB 301 might not be registered with all running MIS instances 201 (cf. the example below regarding the probability that a given MCB 301 will register itself with a given MIS 201).

At the end of the registration loop, the MCB 301 maintains a list of open connections to most MIS instances 201 running in the cloud 200. These connections are preferably used to tunnel the telnet communication between the MCB 301 and the mainframe 302 to the MIS 201 using http tunneling and/or connection multiplexing.

The MCB 301 preferably refreshes its list of MIS connections by repeating the above registration algorithm above under the following conditions: (a) every pre-defined time interval, (b) upon specific request from an MIS instance 201 (see below) and/or (c) upon an abnormal disconnect of an existing MIS connection. In addition, the MCB 301 may send periodic keep-alive messages on every open connection to make sure the connections are not considered idle by the load balancer 202 and thus become candidates for disconnection. On the other side of the connection, each MIS instance 201 preferably maintains a list of active MCB connections, which may be indexed by MCB ID (serving as a unique identifier of the respective MCB 301).

Example

An exemplary MCB 301 with ID "1" registers itself in the cloud computing environment 200 using the following request:
GET/register?id=1

The cloud computing environment 200 currently comprises three running MIS instances 201 with IDs "1", "2" and "3". The following table demonstrates the results of the above-described handshake algorithm:

| Connection Attempt | Destination | Response |
| --- | --- | --- |
| #1 | MIS "1" | "Ok" |
| #2 | MIS "3" | "Ok" |
| #3 | MIS "1" | "Already exists" |
| #4 | MIS "3" | "Already exists" |
| #5 | MIS "2" | "Ok" |

As can be seen above, even if the load balancer 202 implements a round robin policy, it cannot be assumed that a single MCB instance 301 will experience round robin behaviour, since the load balancer's round robin policy applies to all requests received by the load balancer 202, instead of per client IP. Therefore, the redirection sequence will appear to an MCB 301 as a nearly random sequence. Further, there is no guarantee that with a given number of attempts the MCB 301 will indeed be able to connect to all MIS instances 201. However, it can be assumed that with enough attempts it will eventually connect to all MIS instances 201.

To this end, the probability p that a given MCB is registered with a given MIS and the number of MIS instances s at which the MCB is registered can be calculated as follows:
Let m be the number of MIS instances running inside the cloud behind a load balancer and let n be the number of register requests issued by the MCB:

$$p=1-((m-1)/m)^n$$

$$s=p*m$$

The following table lists some exemplary reasonable values:

| MIS instances [m] | MCB requests [n] | Probability that an MCB is registered with a given MIS [p] | Number of MIS instances registered [s] |
|---|---|---|---|
| 1 | 1 | 1.00 | 1.00 |
| 5 | 1 | 0.20 | 1.00 |
| 10 | 1 | 0.10 | 1.00 |
| 20 | 1 | 0.05 | 1.00 |
| 1 | 5 | 1.00 | 1.00 |
| 5 | 5 | 0.67 | 3.36 |
| 10 | 5 | 0.41 | 4.10 |
| 20 | 5 | 0.23 | 4.52 |
| 1 | 10 | 1.00 | 1.00 |
| 5 | 10 | 0.89 | 4.46 |
| 10 | 10 | 0.65 | 6.51 |
| 20 | 10 | 0.40 | 8.03 |
| 1 | 20 | 1.00 | 1.00 |
| 5 | 20 | 0.99 | 4.94 |
| 10 | 20 | 0.88 | 8.78 |
| 20 | 20 | 0.64 | 12.83 |
| 1 | 100 | 1.00 | 1.00 |
| 5 | 100 | 1.00 | 5.00 |
| 10 | 100 | 1.00 | 10.00 |
| 20 | 100 | 0.99 | 19.88 |

In other words, if m=5 MIS instances 201 are started and an MCB instance 301 sends n=20 registration requests to the load balancer 202'S entry point, the probability p that a given MIS instance is reached is 0.99. Therefore, assuming that the MCB instances 301 may refresh their registration requests every pre-defined interval (see above), if an MIS 201 is running for a sufficiently long time the chance that all MCB instances 301 are connected to this MIS instance 201 is very high.

Processing New Client Requests

In the following, the processing of a mainframe request from a client 101, 102, 103 will be described in a scenario where several MIS instances 201 are up and running in the cloud 200 behind a load balancer frontend 202 and several MCB instances 301 are already registered with (most of) the MIS instances 201 (as explained above).

In this context, a client may e.g. represent a browser 101, a web service client 103 and/or a (rich) application client 102 such as a Java Applet, Adobe AIR or Microsoft Silverlight program or any other device or computer program supporting Http/s communication and/or a cookie mechanism.

In a first step (cf. step "Req-1" in FIG. 3), the client 101, 102, 103 connects to the load balancer 202, which in turn redirects the mainframe request in step "Req-2" to one of the MIS instances 201 (in accordance with the load balancer's 202 load balancing strategy, e.g. round robin). The MIS instance 201 identifies which application is used by the client 101, 102, 103, preferably by parsing the information from the client request based on the conventions of the ApplinX product, and retrieves the mainframe address, port and/or emulator negotiation parameters for the specific application from the ApplinX repository.

The MIS 201 now selects one of the MCB instances 301 in its list (see above) and sends a request to the MCB 301 to initiate a mainframe connection (cf. step "Req-4" in FIG. 3), preferably based on the mainframe address and port obtained above and/or additional parameters required for negotiating a mainframe connection, such as LUName, CCSID and/or additional parameters as specified by the ApplinX repository.

The terminal emulation handshake sequence is then performed between the mainframe 302 and MCB 301 based on the application specific mainframe configuration. Once a successful connection is established, the first screen of the mainframe application 302 is sent to the MCB 301 (preferably over telnet) and then to the MIS 201 (preferably over Http/s) together with a unique identifier of the specific mainframe connection. The MIS 201 identifies and processes the received mainframe screen and then sends the response to the requesting client 101, 102, 103, preferably together with a connection identifier cookie that uniquely identifies the specific MCB ID and the specific mainframe connection used by the MCB 301. This cookie is sent back from the client 101, 102, 103 with every subsequent request related to the same session thus allowing the MIS 201 to maintain session affinity by sending subsequent client requests for the same session to the MCB instance holding the same mainframe connection.

After sending the response to the client 101, 102, 103, the MIS 201 possesses the screen image of the current mainframe screen, as well as various session variables, such as username and/or user roles, stored in its memory (hereinafter collectively referred to as the "session state").

The MIS 201 then serializes, i.e. sends, the session state back to the MCB 301, so that it is stored at the MCB 301, preferably together with the current mainframe connection. The MCB instance 301 thus serves as a backup for the session state, so that the session state can be de-serialized from the MCB 301 in case the current MIS instance 201 fails and another MIS instance 201 needs to process client requests for the same mainframe connection.

Since not all MCB instances 301 are typically registered with all MIS instances 201 (see further above), there is a small probability that no MCB instance 301 is registered with the MIS instance 201 which received the client request. In this case, the MIS instance 201 forwards the client request back to the load balancer 202 (cf. step "Req-3" in FIG. 2), together with additional forwarding information (as explained in more detail below in section "Recursive Request Forwarding"). The forwarded request will then be dispatched by the load balancer 202 to a possibly different MIS instance 201 (cf. step "Req-4" in FIG. 2), which in turn will perform the same process until the request is forwarded to an MIS instance 201 which is connected to the MCB 301 instance identified by the connection identifier cookie of the client request.

Processing Client Requests in an Existing Session

In this scenario, several MIS instances 201 are up and running in the cloud 200 behind a load balancer 202 and several MCB instances 301 are already registered with (most of) the MIS instances 201. In addition, one of the MCB instances 301 already established a mainframe connection related to the client 101, 102, 103, and the client 101, 102, 103 already possesses a connection identifier cookie (see above).

In this scenario, the client 101, 102, 103 connects to the load balancer 202, which in turn redirects the request to one of the MIS instances 201.

The contacted MIS instance 201 then deciphers the information in the connection identifier cookie and extracts the contained MCB ID. The MIS 201 then looks up the corresponding MCB 301 (which is that MCB which handled the preceding request/response cycle, from which the connection identifier cookie resulted; see above) in its connection list.

If found, the MIS 201 now obtains the session state, using the "state lookup algorithm" explained further below. After obtaining the session state, the MIS 201 processes the client request using application specific definitions, such as running an ApplinX Path procedure, and sends the relevant telnet communication packets together with the Mainframe connection ID and state information to the MCB 301.

The MCB 301 parses the information sent by the MIS 201, locates the correct mainframe connection and sends the telnet communication packets to the mainframe 302.

The MCB 301 then waits for the response from the mainframe 302 and, once received, sends the mainframe response together with the session state information and the connection ID back to the MIS 201.

The MIS 201 then processes the mainframe response, creates a response (e.g. as a web page or a web service response, depending on the requesting client 101, 102, 103) and sends the response to the client 101, 102, 103 together with an updated connection identifier cookie.

The MIS 201 then sends additional session state information back to the MCB 301, so that it is stored together with the screen image. Again, the session state may be recovered from the MCB 301 in case the MIS instance 201 fails.

Session State

Mainframe integration products, such as ApplinX of applicant, need to maintain state information between client requests, since a "conversation" between a client and a mainframe is inherently comprised of a sequence of request/response cycles in which the client navigates through screens provided one after another by the mainframe. In the present technology, session state data preferably comprises the following information:

the screen image of the screen currently displayed by the mainframe 302 the mainframe connection ID, i.e. an identifier of the connection established between the mainframe 302 and corresponding MCB 301)

one or more session variables (preferably in the form of a map data structure) representing application specific information relevant for the specific session, such as username, user roles and/or business logic related information.

The session state may be implemented as a serialized object, so that it can be transferred between the MIS 201 and MCB 301 (as explained above). In most cases, the size of the session state should not exceed 20 k bytes, thereby allowing a seamless synchronization of the session state between the MIS 201 and the MCB 301.

State Lookup Algorithm

When a client request is received by a given MIS instance 201, the MIS instance 201 has to first obtain the most current session state in order to be able to process the client's mainframe request. Further, the MIS 201 has to contact an MCB 301 in order to send the processed information to the mainframe 302.

Importantly, since a client 101, 102, 103 cannot directly communicate with a MIS 201, but only with the cloud entry point of the cloud computing environment 200 (cf. FIG. 1), the client 101, 102, 103 cannot influence which particular MIS instance 201 inside the cloud computing environment 200 will handle its request. This is because each client request is dispatched to one of a possible plurality of MIS instances 201 by the load balancer 202. Therefore, scenarios may occur in which one particular MIS 201 was used for a first request/response cycle of a particular client, but another MIS 201 is selected by the load balancer for a subsequent request/response cycle of that particular client, even within the same session. As a result, there exist various scenarios concerning which component (MIS 201 and/or MCB 301) obtains the most current session state and MCB connection, e.g.:

1. The MIS 201 currently receiving the client request possesses the session state and the MCB connection.
2. The MIS 201 currently receiving the client request possesses the MCB connection, but another MIS 201 in the cloud 200 possesses the most current session state.
3. The MIS 201 currently receiving the client request possesses the session state, but another MIS 201 possesses the MCB connection.
4. The most current session state is possessed by an MCB 301 that is known to the MIS 201 currently receiving the client request.
5. The most current session state is possessed by an MCB 301 that is unknown to the MIS 201 currently receiving the client request.

The preferred algorithm for obtaining the most current session state performed by the MIS 201 currently receiving the client request is as follows:

In the above scenario 1, the current MIS 201 already possesses the session state in memory. The MIS 201 then deciphers the MCB instance ID from the connection identifier cookie to see if it already has a connection to this MCB instance 301. If so, it will immediately process the request and send the response back to the client. This is the optimal scenario and it should be the case for most client requests, since the load balancer 202 may be configured to redirect subsequent requests from the same client 101, 102, 103 to the same MIS 201 based on the value of the connection identifier cookie (see further above), which in most cases does not change for the lifetime of the session.

In scenario 2, the current MIS 201 deciphers the connection identifier cookie and obtains the address of the preferred MIS instance ID stored therein. The MIS 201 will then forward the request to the preferred MIS instance 201 and ask it to process the client request. Once the client request is processed by the preferred MIS instance 201, the response is sent as is from the current MIS 201 back to the client.

In scenario 3, the current MIS 201 already has the session state in memory, but it cannot send the processed request to the mainframe 302, since it does not obtain an MCB connection. In this case, the current MIS 201 forwards the client request back to the load balancer 202, preferably using recursive request forwarding (as explained further below) and includes the serialized session state in the request. The request will be processed by another MIS instance 201 until eventually reaching a MIS instance 201 that already has a connection to the specific MCB instance 301. The forwarded MIS instance 201 now de-serializes the session state and processes the request according to scenario 1 above. In addition, the MIS 201 notifies the MCB instance 301 that it is not registered with the original MIS 201, thus instructing the MCB 301 to refresh its registration.

In scenario 4, the current MIS 201 does not obtain the session state and cannot forward the request to the preferred MIS 201, possibly because this particular MIS 201 is no longer available. In this case, the current MIS 201 will decipher the MCB instance id, and send a request to the MCB 301 to obtain the most current session state from the MCB 301. In response, the MCB 301 serializes the session state back to the current MIS 201 and then the current MIS 201 processes the request and becomes the preferred 201 MIS for the session.

In scenario 5, the current MIS 201 does not obtain the session state and is not connected to the MCB instance id used by the current session. The MIS 201 thus forwards the client request back to load balancer 202. The request is then dispatched to and processed by another MIS instance 201, until eventually reaching an MIS instance 201 which already has a connection to the specific MCB instance 301. The forwarded MIS instance 201 now processes the request according to scenario 1 or 4 above.

Connection Identifier Cookie

The following information is preferably comprised in the connection identifier cookie:
  Preferred MIS instance ID: an identifier of the preferred MIS instance 201 (e.g. the internal cloud IP address and/or port of the MIS 201 which has the most current session state).
  MCB instance ID: an identifier of the used MCB instance 301 (e.g. a unique identifier of the MCB instance 301 which manages the mainframe connection).
  Connection ID: a unique identifier of the specific mainframe connection managed by the MCB instance 301.

The contents of the connection identifier cookie may be hashed e.g. using MD5 or a similar hashing algorithm, before it is sent to the client.

Load Balancer Policy

Preferably, the cloud load balancer 202 uses one or more of the following policies when distributing client and MCB requests between MIS instances 201:
  "Sticky policy" based on the connection identifier cookie: this policy ensures that client requests for an existing session are always forwarded to the preferred MIS instance 201 which obtains the most current session state.
  "Round Robin policy": requests which do not contain a connection identifier cookie are distributed randomly/evenly between the MIS instances 201 currently running in the cloud 200, using round robin or other non-sticky policies. This strategy is preferably applied to initial client connection requests, MCB register requests and/or MIS recursive forwarding requests.

Recursive Request Forwarding

In case the currently contacted MIS 201 cannot process a client request (for the reasons explained above), the MIS 201 forwards the request back to the load balancer 202, preferably adding a forwarding cookie that comprises the identifier of that particular MIS 201. The load balancer 202 then routes the request to an MIS instance 201 according to its load balancing policy (see above).

The MIS 201 receiving the request will then try to process it. If the processing is successful, it will return the response to that MIS 201 which was originally contacted, which in turn will return the response to its caller until the response is sent back to the original client.

In case the MIS 201 receiving the request cannot process it, it will parse the chain of forwarding contained in the forwarding cookie. If it finds itself in the forwarding chain, this means that this request was already forwarded by this MIS 201. The 201 then returns a failure message indicating to the caller MIS to re-issue the request.

In case the forwarding chain is longer than a predefined threshold value, the MIS 201 may return a failure status indicating to the caller MIS to abort the request. The forwarding chain threshold is further explained below.

In all other cases, the current MIS 201 preferably adds itself to the forwarding chain and forwards the request back to the load balancer 202.

HTTP Tunneling and Connection Multiplexing

An MCB instance 301 preferably maintains a plurality of (telnet-based) connections to a mainframe 302, but preferably only a single HTTP request to each MIS instance 201 with which it has registered. To this end, the MCB instance 301 may multiplex several mainframe connections over a single HTTP connection and may tunnel the telnet packets as HTTP requests.

In order to prevent sending many small HTTP requests, both the MIS 201 and MCB 301 may utilize the well-known Nagle algorithm in order to buffer requests and then sending a plurality of buffered requests in on larger chunk.

Increasing the Number of MIS Instances

Depending on the configuration of the cloud computing environment 200, when a given number of MIS instances 201 can no longer sustain the load, new MIS instances 201 may be dynamically started (spawned). Initially, newly spawned MIS instance 201 does not have any registered MCB connections. Therefore, such MIS instance 201 is unable to handle client requests on its own and will have to either forward client requests directly to their preferred MIS 201 or, for new client connection requests, use recursive forwarding (see above).

In order to make newly spawned MIS instances 201 operable more quickly, MCB instances 301 may frequently send a "refresh register" message to the load balancer 202 in an attempt to register with newly spawned MIS instances 201. As explained above, given enough MCB register requests, eventually all MCB instances 301 will be registered with the new MIS instances 201. Once the registration is complete, the new instance will start working at full capacity.

To further optimize this process, MIS instances 201 registered with an MCB 301 may notify the MCB 301 when receiving a request forwarded from an MIS 201 for which this MCB 301 is not registered. When receiving such a notification, the MCB 301 may attempt again to register itself with all MIS instances 201.

Decreasing the Number of MIS Instances

A central benefit of deploying an application "to the cloud" is the ability to cope with variable loads. However, typical mainframe integration products cannot reduce the number of instances without disconnecting existing sessions or alternatively waiting for all sessions to terminate before shutting down an existing instance, which can be very time consuming, if possible at all. One advantage of the MIS instances 201 of the present technology is that they can be shutdown quickly and with no (or minimal) side effects. This is because the session state is replicated to an MCB 301, so that it is possible to immediately shutdown an unused or only lightly used MIS instance 201 without losing or disrupting any existing session. The load balancer 202 is able to detect that a MIS instance 201 has shutdown and may dynamically redirect all requests to other MIS instances 201, which will in turn restore the session state from the corresponding MCB instances 301.

In summary, one central aspect of the present technology is to create an abstraction layer around the TCP/IP socket between the application server running the mainframe integration application, and the mainframe itself and tunnel all communication between the application deployed to the cloud and the mainframe inside the corporate firewall using standard HTTP/S protocols. This allows the corporate network to communicate with application deployed to the cloud using a non-persistent HTTP/S connection on ports 80 or 443, as well as to support SSL encryption. Furthermore, it allows the application deployed to the cloud to use stateful sessions with serializable state (as opposed to maintaining an open TCP/IP socket, as in the prior art, which forces the mainframe integration product to use stateful sessions with non serializable state since the TCP/IP socket itself cannot be serialized), thus allowing the sessions to be easily replicated and to provide failover capabilities between notes in the cloud. As explained above, the central components of a preferred embodiment are on the one hand the Mainframe Communication Bridge (MCB), installed inside the corporate network, preferably behind a firewall (possibly even on the mainframe itself), which encapsulates the mainframe communication protocol using standard HTTP, as well as on the other hand the Mainframe Integration Server (MIS), installed in the cloud, which translates the HTTP packets into Mainframe protocol packets for use by the application. However, as explained above, the present technology is not limited to mainframes, but the above-explained advantageous concepts may well be applied to all kinds of session-aware applications, such as database servers maintaining persistent connections to a database, etc.

The invention claimed is:

1. A cloud-based mainframe integration system for providing at least one client access to at least one mainframe, the at least one mainframe being accessible over a persistent communication connection, wherein the cloud-based mainframe integration system comprises:
   at least one mainframe integration server (MIS), implemented using at least one information processing apparatus having at least one processor, and configured to route communications, via a cloud computing environment, between the at least one client and the at least one mainframe; and
   a load balancer configured to communicate with each MIS instance,
   wherein the at least one MIS is located within the cloud computing environment separate from a computer network in which the at least one mainframe is located,
   wherein the cloud computing environment provides a dynamically allocated pool of virtual machines and a single domain URI entry point, each MIS instance publishing a unique URI enabling communication between MIS instances and enabling communication between each MIS instance and the single domain URI entry point,
   wherein the at least one MIS is configured to communicate over the separate computer network, with the at least one mainframe, over a non-persistent communication connection, and
   wherein the load balancer represented by the single domain URI entry point and routing requests to target MIS instances.

2. The cloud-based mainframe integration system of claim 1, further comprising at least one mainframe communication bridge located within the network of the at least one mainframe, the at least one MCB being configured to maintain a persistent communication connection with the at least one mainframe and further configured to communicate with the cloud computing environment over the non-persistent communication connection.

3. The cloud-based mainframe integration system of claim 1, wherein the at least one MIS is adapted for storing a session state relating to a request/response cycle of the communication between the at least one client and the at least one mainframe, the session state being usable for subsequent request/response cycles between the at least one client and the at least one mainframe.

4. The cloud-based mainframe integration system of claim 3, wherein the at least one MIS is configured to send the session state to the at least one MCB for storage at the at least one MCB.

5. The cloud-based mainframe integration system of claim 1, wherein the load balancer is configured to dispatch a communication coming from the network of the at least one mainframe to one of a plurality of MIS inside the cloud computing environment.

6. The cloud-based mainframe integration system of claim 5, wherein the MIS selected by the load balancer is configured to obtain a current session state relating to the communication from another MIS, if the selected MIS does not possess the current session state.

7. The cloud-based mainframe integration system of claim 5, wherein the MIS selected by the load balancer is configured to obtain a current session state relating to the communication from at least one MCB, if none of the other MIS possesses the current session state.

8. The cloud-based mainframe integration system of claim 1, wherein the at least one MIS is configured to send a connection identifier to the at least one client, the connection identifier identifying the MCB which handled the communication between the at least one client and the at least one mainframe.

9. The cloud-based mainframe integration system of claim 8, wherein the at least one MIS is configured to receive a client request comprising the connection identifier and further configured to determine whether it already established a connection to the at least one MCB identified by the connection identifier, and if not, redirecting the client request to the load balancer.

10. The cloud-based mainframe integration system of claim 9, wherein the at least one MIS adds its own identifier to the client request when redirecting the client request to the load balancer.

11. The cloud-based mainframe integration system of claim 2, wherein the at least one MCB is configured to communicate with the at least one MIS only via the load balancer, and wherein the at least one MCB is configured to send a plurality of registration requests to the load balancer in order to register with substantially all MIS.

12. A method for providing at least one client access to at least one mainframe, the at least one mainframe being accessible over a persistent communication connection, the method comprising:
   routing, by at least one mainframe integration server (MIS), via a cloud computing environment, communications between the at least one client and the at least one mainframe; and
   communicating with each MIS instance via a load balancer,
   wherein the at least one MIS is located within the cloud computing environment separate from a computer network in which the at least one mainframe is located,
   wherein the cloud computing environment provides a dynamically allocated pool of virtual machines and a single domain URI entry point, each MIS instance publishing a unique URI enabling communication between MIS instances and enabling communication between each MIS instance and the single domain URI entry point, wherein the at least one MIS is configured to communicate over the separate computer network, with the at least one mainframe, over a non-persistent communication connection, and wherein the load balancer represented by the single domain URI entry point and routing requests to target MIS instances.

13. The method of claim 12, further comprising:

storing, by the at least one MIS, a session state relating to a request/response cycle of the communication between the at least one client and the at least one mainframe, the session state being usable for subsequent request/response cycles between the at least one client and the at least one mainframe; and/or sending, by the at least one MIS, the session state to at least one mainframe communication bridge located within the network of the at least one mainframe for being stored at the at least one MCB.

14. The method of claim 12, further comprising: sending, by the at least one MIS, a connection identifier to the at least one client, the connection identifier identifying the MCB which handled the communication between the at least one client and the at least one mainframe.

15. A non-transitory computer-readable storage medium tangibly storing a computer program comprising instructions for causing a computer of an information processing apparatus to perform functionality comprising:

routing, by at least one mainframe integration server (MIS), via cloud computing environment, communications between the at least one client and the at least one mainframe; and communicating with each MIS instance via a load balancer, wherein the at least one MIS is located within the cloud computing environment separate from a computer network in which the at least one mainframe is located, wherein the cloud computing environment provides a dynamically allocated pool of virtual machines and a single domain URI entry point, each MIS instance publishing a unique URI enabling communication between MIS instances and enabling communication between each MIS instance and the single domain URI entry point, wherein the at least one MIS is configured to communicate over the separate computer network, with the at least one mainframe, over a non-persistent communication connection, and wherein the load balancer represented by the single domain URI entry point and routing requests to target MIS instances.

16. The cloud-based mainframe integration system of claim 1, wherein the at least one MIS is configured to communicate with the at least one mainframe using at least one mainframe communication bridge, and communications between the MIS and the at least one mainframe communication bridge are conducted using a standard internet protocol where communications between the at least one mainframe communication bridge and the at least one mainframe are conducted using a mainframe protocol.

17. The cloud-based mainframe integration system of claim 16, wherein using the standard protocol for communications between the at least one MCB and the MIS replaces standard telnet connections between the MIS and the at least one mainframe with a request/response mode over standard IP communication.

18. The cloud-based mainframe integration system of claim 16, wherein the MIS communicates both inbound and outbound requests using only the standard internet protocol.

19. The cloud-based mainframe integration system of claim 1, wherein the single domain URI entry point is used by all clients and MCB instances to communicate with one or more MIS instances.

20. The cloud-based mainframe integration system of claim 1, wherein a number of one or more MIS instances running inside the cloud computing environment is adjustable based on workload demand.

* * * * *